R. WOODS.
GRAIN SHOCKER.
APPLICATION FILED MAY 28, 1912.
1,073,456.
Patented Sept. 16, 1913.
2 SHEETS—SHEET 1.
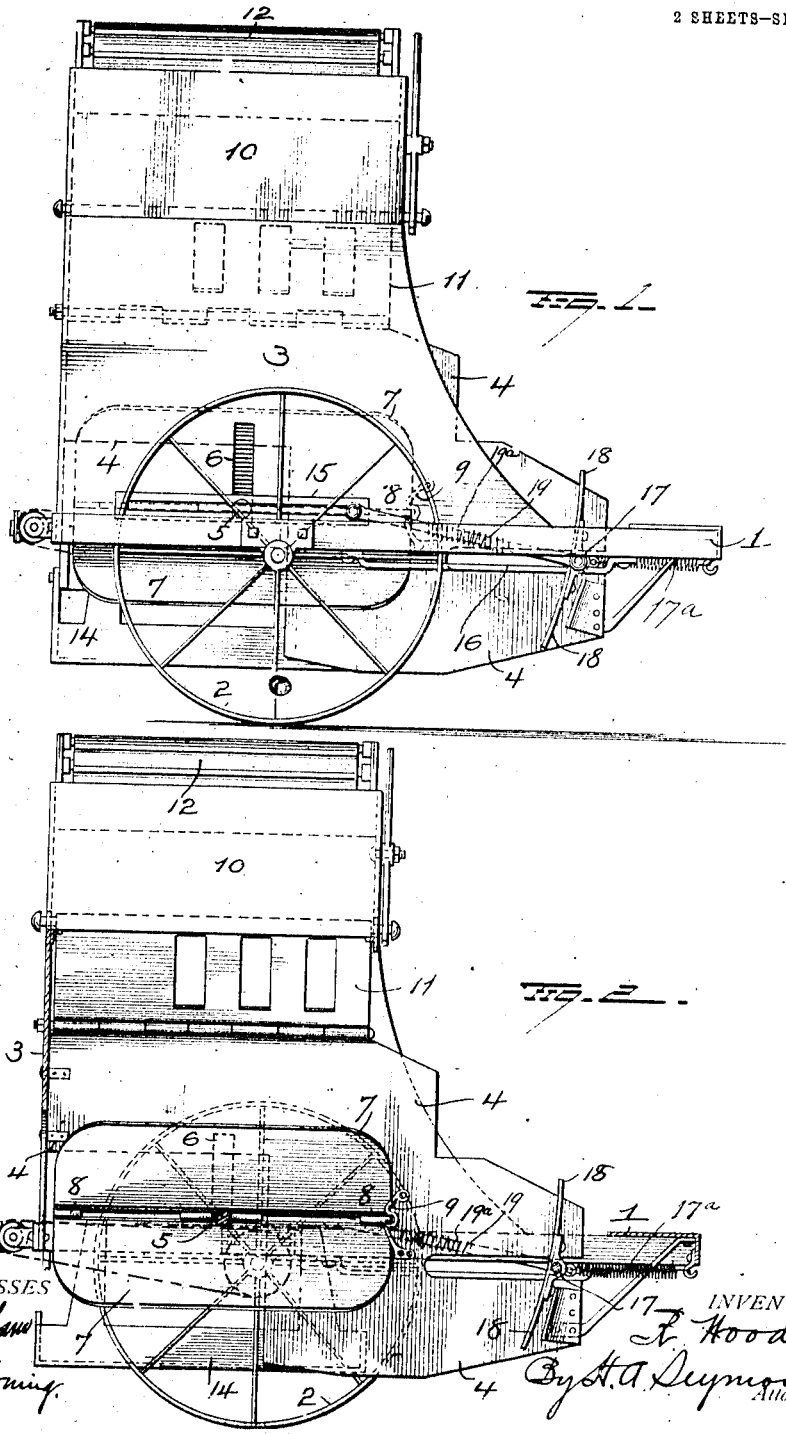

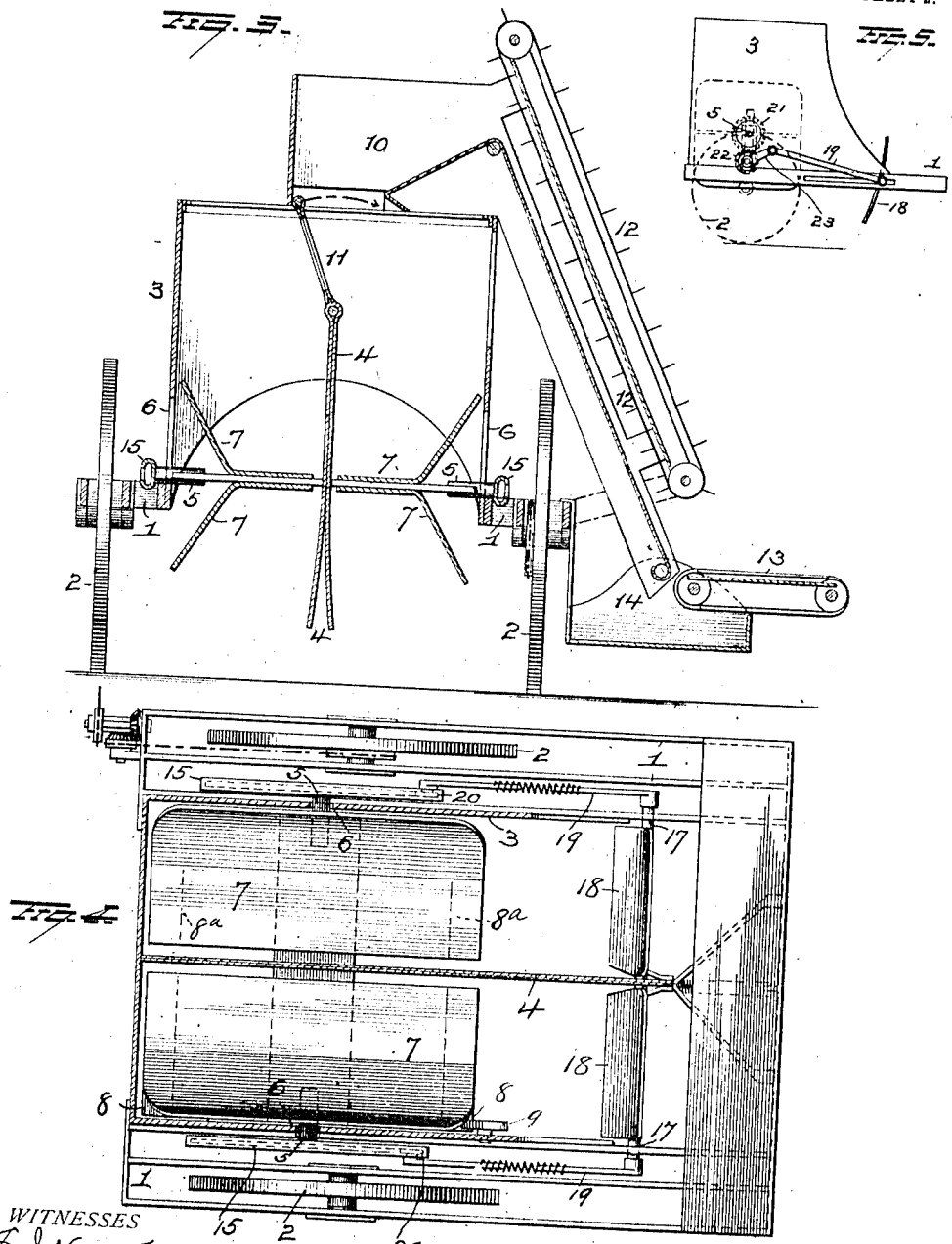

UNITED STATES PATENT OFFICE.

ROBERT WOODS, OF GRAND FORKS, NORTH DAKOTA.

GRAIN-SHOCKER.

1,073,458.   Specification of Letters Patent.   Patented Sept. 16, 1913.

Application filed May 28, 1912. Serial No. 700,193.

*To all whom it may concern:*

Be it known that I, ROBERT WOODS, a citizen of Canada, residing at Grand Forks, in the county of Grand Forks and State of North Dakota, have invented certain new and useful Improvements in Grain-Shockers; and I do hereby declare the following to be a full, clear, and exact description of the invention, such as will enable others skilled in the art to which it appertains to make and use the same.

This invention relates to improvements in grain shockers for use in connection with harvesting machines,—one object of the invention being to construct the device in such manner that the shocks, after having been assembled, will be so discharged that they will stand firmly upon the ground.

A further object is to provide means for collecting any such loose grain as may escape from the bundles or sheaves during the conveying of the same to the shock-forming receptacle.

A further object is to provide improved "tucker" devices and means for automatically operating the same.

A further object is to so construct the machine that a shock will be assembled in two parts and so that the divided shock shall be spread at the base when it is being deposited upon the ground in an upright position.

With these objects in view the invention consists in certain novel features of construction and combinations of parts as hereinafter set forth and pointed out in the claims.

In the accompanying drawings; Figure 1 is a side elevation; Fig. 2 is a longitudinal sectional view; Fig. 3 is a transverse sectional view; Fig. 4 is a horizontal sectional view, and Fig. 5 is a view illustrating a modification of the tucker operating devices.

1 represents a frame mounted on suitable carrying wheels 2. Rising from this frame, inside the wheels, is a casing 3 which constitutes a receptacle for shocks,—the sheaves or bundles forming the latter being deposited into said receptacle and received by dumping devices within the lower portion of said receptacle, as more fully hereinafter explained.

The casing or receptacle 3 is divided longitudinally by a central partition 4, thereby forming two compartments in said receptacle. The rear portion of this partition is cut away, as shown by dotted lines in Figs. 1 and 2, and the forward portion depends below the dumping devices (passing between the latter). At its lower edge the partition is spread or widened for the purpose of spreading the divided portions of the shock as the latter is discharged from the dumping devices. In this manner the shock will be spread at the base and thus caused to stand firmly upon the ground in an upright position. A shaft 5 (shown in the drawing as a flat plate provided at its ends with journals) has bearings near its ends in the side walls of the casing 3 and in order that said shaft may have more or less vertical play, said bearings may be vertically movable or the shaft may be mounted in elongated slots 6 in the sides of said casing. To this shaft (which is disposed in rear of the depending forward portion of the partition as shown in Fig. 2), four dumping trays 7 are rigidly secured,—two such trays being located at each side of the partition 4 and the trays of each pair are disposed back to back with the plate or shaft 5 between them as clearly shown in Fig. 3. One pair of dumping trays is provided at respective ends thereof, with laterally projecting arms 8, one of which normally rests upon a suitable trip device 9 and in this manner the trays are held normally in horizontal position to receive bundles of grain which are discharged thereinto from a hopper 10 located above the receptacle. The arms 8 are disposed between the tray of one pair (serving as spacers for the same) and the end portions of the trays of the other pair are spaced by strips 8ª as shown by dotted lines in Fig. 4. The discharge opening in the bottom of the hopper 10 is located directly over the partition 4 and between the upper edge of this partition and the bottom of the hopper, a shiftable gate 11 is provided for the purpose of directing the bundles of grain first into one compartment and then into the other. This gate may be mounted in various ways but I have found it convenient to hinge the same at its lower edge to the upper edge of the partition 4. The bundles of grain are discharged into the hopper 10 from a suitable elevator 12 and the bundles are received by said elevator from a short conveyer 13, which latter receives them from the binder.

At the intersection of the elevator and short conveyer and under the same, a tray 14 is located to receive such loose grain and foul seed as may escape from the bundles during transit from said short conveyer to the hopper 11. This tray may be conveniently supported by the frame 1 and it may also be attached to the framework of the elevator and conveyer.

The shaft 5 to which the dumping trays are secured, projects at its ends beyond its bearings in the sides of the receptacle 3 and to these projecting ends of the shaft, slotted or grooved bars 15 are secured centrally between their ends. Near the forward end of the frame 1, guides 16 are provided for the accommodation of a forwardly and backwardly movable shaft 17 to which tucker plates 18 are attached at respective sides of the partition 4. Springs $17^a$ attached at one end to said shaft 17 and at the other end to the frame 1, serve to normally retain the shaft 17 and the tucker plates in and to return them to their rearward position. Pitmen 19 are attached to respective ends of the tucker shaft and the rear ends of said pitmen are provided with suitable heads or arms 20 which are movable in the grooved or slotted bars 15 on the ends of the shaft 5. The pitmen 19 may be made with coiled springs $19^a$ so that the tucker plates may be permitted to yield when a large shock is being discharged from the machine. The pitmen may be made yielding in any other desired manner or if preferred these pitmen may consist of solid rods.

In operating the machine, the bundles of grain are fed through the hopper into one of the compartments of the receptacle 3 until a proper amount has been accumulated and then the gate 11 will be shifted so as to cause the bundles of grain to enter the other compartment and be discharged upon the dumping tray therein. After both the dumping trays shall have been properly filled, the trays will be released by manipulation of the trip device 9 and the predominance of weight at the butt ends of the bundles, will cause the trays to turn forwardly and discharge the divided shock onto the ground, and at the same time, the base of the shock will be spread by the flaring lower edge of the partition 4 as previously explained, so as to provide a broad and firm bearing for the shock upon the ground. While a shock is being discharged by the tilting of the dumping trays, it will be met and caused to be properly disposed in an upright position by the action of the tucker plates,—said tucker plates being moved rearwardly toward the shock by power transmitted to them through the medium of the grooved or slotted bars 15 and pitmen 19 during the turning of the shaft 5 to which the dumping trays are secured. After a shock has been discharged, the dumping trays will be in a vertical position against one side of the shock and the tucker plates will bear against the opposite side of the shock. As the machine moves forwardly, the engagement of the now lower ends of the dumping trays with the upper portion of the shock will cause said dumping trays to complete a half turn and become again disposed in a horizontal position, positioning the previously lower trays to receive another shock. During the movement of the trays from the vertical position to the horizontal position above described, the heads or arms 20 on the pitmen 19, will slide freely from one end to the other of the grooved or slotted bars 15 (being caused to thus move by the action of the springs $17^a$) and the tucker plates will thus be returned to their normal forward positions.

Instead of effecting the backward and forward reciprocations of the tucker plates as above described, the construction shown in Fig. 5 may be employed. In this arrangement, the shaft 5 is provided with a gear 21 at each end and these gears impart motion to smaller gears or pinions 22,—all of said gears being mounted in suitable boxes in the sides of the casing 3 and said boxes may be so mounted as to have vertical play to insure proper meshing of the gears. The smaller gears 22 or the journals to which said gears are secured are provided with crank-arms 23 with which the rear ends of the pitmen 19 are connected. With this construction, the tucker plates will be caused to move first rearwardly and then forwardly during each half revolution of the dumping trays and effect the same results as previously described in connection with the preferred construction of my improvements.

Having fully described my invention what I claim as new and desire to secure by Letters-Patent, is:

1. In a shocker, the combination of a receptacle, a vertical partition dividing said receptacle into two compartments, trays mounted in said compartments and rotatable simultaneously about an axis perpendicular to said partition, and means for controlling the rotation of said trays.

2. In a shocker, the combination with a receptacle divided into two compartments by a vertical partition, of tilting trays mounted in said compartments, said trays being simultaneously movable about an axis perpendicular to said partition, tucker plates in front of said trays and movable toward and away from the same, and devices controlled by the movements of said trays for operating and controlling said tucker plates.

3. In a shocker, the combination with a receptacle and two simultaneously movable dumping trays rotatably mounted in said receptacle, of a partition separating said trays, said partition having flaring lower edges depending below the axes of the dumping trays to spread the parts of a divided shock discharged from said trays.

4. In a shocker, the combination with a receptacle and a vertical partition therein dividing said receptacle into two vertical compartments, of dumping trays in said compartments, and simultaneously movable about an axis perpendicular to said partition, a hopper over the receptacle, and a movable gate for directing bundles of grain from said hopper into one or the other of the compartments of the receptacle.

5. In a shocker, the combination with a receptacle and a vertical partition therein dividing said receptacle into two vertical compartments, said partition having a flaring lower edge, of dumping trays in said compartments and simultaneously movable about an axis perpendicular to the partition, a hopper over the receptacle and a hinged gate between said hopper and the upper edge of the partition for causing bundles of grain to be discharged into the compartments, one compartment at a time, whereby a divided shock is formed in said receptacle.

6. In a shocker, the combination with a receptacle, of a shaft extending transversely across the lower portion thereof, a dumping tray secured to said shaft, a tucker shaft in the forward portion of the machine, tucker plates attached to said tucker shaft, slotted bars secured between their ends to respective ends of the first mentioned shaft, and pitmen attached at their forward ends to the tucker shaft and movably connected at their rear ends with said slotted bars.

7. In a shocker, the combination with a frame and a receptacle thereon, of a shaft extending transversely across the lower portion of said receptacle, a dumping tray on said shaft, slotted bars secured between their ends to respective ends of said shaft, a rearwardly and forwardly movable tucker shaft mounted on the forward portion of the frame, and yielding pitmen connected at their forward ends with the tucker shaft and at their rear ends having movable connection with said slotted bars.

In testimony whereof, I have signed this specification in the presence of two subscribing witnesses.

ROBERT WOODS.

Witnesses:
M. J. QUARUM,
H. BENDEKE.